United States Patent [19]

Othmer

[11] 3,989,510

[45] Nov. 2, 1976

[54] MANUFACTURE OF TITANIUM CHLORIDE AND METALLIC IRON FROM TITANIFEROUS MATERIALS CONTAINING IRON OXIDES

[76] Inventor: Donald F. Othmer, 330 Jay St., Brooklyn, N.Y. 11201

[22] Filed: Apr. 12, 1974

[21] Appl. No.: 460,383

Related U.S. Application Data

[63] Continuation-in-part of Ser. No. 352,947, April 20, 1973, Pat. No. 3,859,077, which is a continuation-in-part of Ser. No. 235,531, March 17, 1972, abandoned.

[52] U.S. Cl. .................................. 75/1 T; 75/21; 75/26; 75/40; 423/76; 423/84; 423/492
[51] Int. Cl.² .................. C22B 1/00; C22B 5/10; C22B 5/16
[58] Field of Search ............... 75/1, 26, 38, 40, 113, 75/68 A, 68 B; 423/76, 77, 84, 492

[56] References Cited
UNITED STATES PATENTS

| | | | |
|---|---|---|---|
| 1,392,044 | 9/1921 | Booth et al. | 75/113 X |
| 2,167,627 | 8/1939 | Alessandroni | 75/1 |
| 2,815,272 | 12/1957 | Armant et al. | 75/1 X |
| 2,815,272 | 12/1957 | Armant et al. | 75/1 |
| 2,933,373 | 4/1960 | Love et al. | 75/1 X |
| 3,252,787 | 5/1966 | Shiah | 75/1 X |
| 3,418,074 | 12/1968 | Sargeant | 75/1 X |
| 3,793,003 | 2/1974 | Othmer | 75/68 B |
| 3,856,508 | 12/1974 | Othmer | 423/135 X |

FOREIGN PATENTS OR APPLICATIONS

| | | | |
|---|---|---|---|
| 781,220 | 8/1957 | United Kingdom | 423/84 |

*Primary Examiner*—Allen B. Curtis
*Assistant Examiner*—Thomas A. Waltz

[57] ABSTRACT

A reactor operating at a maximum temperature above 1535° C and up to about 1950° C is charged with a mixture of: (a) iron bearing titaniferous ore or its concentrate, or a residue from other operations containing iron and titanium, at least some of which is present as oxides, also (b) silica — combined or separately added, also (c) one or more chlorides of a third metal of the alkaline or alkaline earth group, such as common salt and/or calcium chloride, also (d) a solid reductant as coke. Some impurities of the original material are removed as volatile chlorides or oxy-chlorides; the titanium also goes off as $TiCl_4$ in the gas stream, the iron is withdrawn as molten metallic iron, and the third metal added as the chloride: e.g., the sodium of the common salt or the calcium of its chloride unites with the silica to give a silicate, such as sodium silicate (water glass) and/or calcium silicate which acts as a flux to remove the gangue from the iron. Most of the chlorine is supplied by the chlorine in this third-metal chloride through the separation by the chloride interaction with the iron and titanium: including that leaving in the titanium tetra-chloride, and in other volatile chlorides or oxy-chlorides, or remaining in the gangue as non-volatile chlorides. This third metal, such as the sodium and/or calcium, unites with the silica to form an effective silicate flux to remove various solid impurities.

38 Claims, No Drawings

MANUFACTURE OF TITANIUM CHLORIDE AND METALLIC IRON FROM TITANIFEROUS MATERIALS CONTAINING IRON OXIDES

This Application is a Continuation in Part of copending Application U.S. Ser. No. 352,947 of Apr. 20th, 1973 now U.S. Pat. No. 3,859,077 of Jan. 7, 1975 entitled: Manufacture of Titanium Chloride, Synthetic Rutile, and Metallic Iron from Ilmenite, which was a continuation in part of U.S. Ser. No. 235,531 of Mar. 17, 1972 entitled 'Method for Making Rutile', now abandoned.

Ilmenite or other titaniferous iron ore, such as ilmenitehematite and others, or their concentrates, or a comparable iron-titanium residue from other processing may be intimately mixed with common salt or calcium chloride and coke; and if the charge stock contains insufficient silica for the reaction hereinafter described, this may also be added as sand. The mixture may be pulverized, then charged into the reactor maintained at a temperature preferably not over 1950° C but above 1550° C if salt is used or above 1600° C if calcium chloride is used. The reaction of the silica with the calcium or sodium of its chloride gives the corresponding silicate; and the chlorine of this third-metal chloride unites with the titanium of the mixture to give titanium tetrachloride.

Simultaneously the iron oxide originally present is reduced by the coke to metallic iron, probably after going through an iron chloride form. Preferably the reaction is conducted at a maximum temperature not over about 1950° C, but above the melting point, 1535° C, of iron, which then discharges in molten form, while the gaseous titanium halide passes off with other volatile materials. If calcium chloride is used, the reaction goes at a temperature above 1600° C, sufficiently above the melting point of calcium silicate. The molten iron is drawn off for casting as pigs, much as in a conventional blast furnace, and thus is separated in a commercial form.

The third-metal chloride, e.g., common salt or calcium chloride, which is used as the chlorinating agent instead of elemental chloride, is added in sufficient amount so that it can supply most or all of the chlorine required in the chemical reactions — although in some cases additional elemental chloride is added. Chlorine from the element — or mainly from the chloride is required to produce (a) the titanium tetrachloride, also (b) the other volatile chlorides or oxychlorides of other metals present which are formed and go off as a gas discharge or remain as non-volatile chlorides in the gangue, and (c) as make-up chlorine for that lost in the processing. The sodium or calcium of its chloride salt, in reacting with the silica, forms a desirable flux of the respective silicate for removing from the molten iron the gangue containing the other solid impurities in a molten slag. ($Na_2SiO_3$ melts at 1088° C when pure, and $CaSiO_3$ at 1540° C.) Sufficient silica is added to react with all of the third-metal in the added chloride.

Sodium and calcium chlorides are used as readily available and cheap examples; but, in general, there may be used any of the salts with the three lower halides of the alkaline or alkaline earth metals. Sometimes mixtures of salts of the same halide are desirable, i.e., common salt and calcium chloride in a mixture.

The mineral rutile, $TiO_2$, appears in very much smaller amounts and in many fewer places in the earth's crust than does the mixed oxides of titanium and iron, ilmenite ($FeO\cdot TiO_2$). Rutile contains, per ton, much more titanium than does ilmenite; but it may have a market value based on the titania content of several or more times as much. Silica is often present in the ilmenite concentrate used, more may be allowed to remain in the process of beneficiation of the ore, or it may be added as sand in the desired amount for a particular ore to react to form the silicate with the amount of third-metal in the chloride required to supply the necessary chlorine.

While ilmenite is often mentioned hereinafter, other materials, particularly those titaniferous ores or residues containing iron, may be processed similarly. Either native or added silica is necessary in at least the stoichiometric amount with the third metal. Much chemical processing of ilmenite, including all of that discussed hereinafter, may be considered as taking place on the individual oxides of iron and titanium as if they were merely in physical mixture in the ore; and reactions and their chemical equations may be considered as if the oxides of the two metals were not chemically combined. Often ilmenite and other titaniferous ores contain another oxide of iron, as $Fe_2O_3$ in various quantities, as for example the large amounts of ilmenite-hematite ores in Canada, which may be regarded as $FeO\cdot TiO_2(Fe_2O_3)_x$.

Chlorine as such, or from its salts, is much the most available and inexpensive halogen to use in any halogenation process, thereby producing metallic chlorides: also hydrogen chloride from any hydrogen present as moisture in any of the added materials.

Bromine and sometimes fluorine also may be used in the present process either as elements or from salts, although each has obvious disadvantages, sometimes advantages. Iodine is not suitable for the present processing. Since the three lower halogens and their halides may be used as halogenation agents, it is understood that they are included in the description of the several aspects of this invention, although only the chlorination steps and the chlorides are usually mentioned. The titanium tetrahalide is always formed: $TiCl_4$ boils at about 136° C, $TiBr_4$ at 230° C, and $TiF_4$ sublimes at about 284° C. Thus, the vaporization point of the product, tetrahalide, is always below 285° C; and that of $TiI_4$ is about 377° C.

While it would not be expected that a chloride of a metal higher than titanium in the chlorine affinity series could be used to make $TiCl_4$, it has now been found that common salt, the cheapest chlorine compound, will give up its chlorine to titanium in the presence of silica, while forming also sodium silicate. The same is true for the chlorides of the other alkaline or alkaline earth metals, which form $TiCl_4$ and their respective silicates. Another good example is calcium chloride, which is also very cheap, or actually a waste product in many places. Similarly, the fluorides and bromides of the other alkaline and alkaline earth metals may be used, each having its own particular advantages under different conditions. Usually only common salt or calcium chloride is mentioned herein, as exemplary of the others.

These unexpected reactions, by which the halogen of a salt with a metal having a relatively very much higher affinity therefor than does titanium can be used to halogenate the titanium in the presence of the reductant, are due to the high affinity of these same metals or their oxides for silica — to produce the corresponding silicates, while simultaneously producing metallic iron.

Meanwhile, volatile halides or oxyhalides will be formed of some other materials present: e.g., phosphorous, chromium and sulfur (the S then goes from its chloride to $SO_2$ by taking oxygen from a metal oxide if necessary). Halogen acids will also be in this vapor stream, the hydrogen being obtained from that in the coke used, or in any water present in the solids or gases entering the system.

The importance of these reduction halogenations, generally a chlorination, is that the iron is reduced to metal by the solid reductant, usually coke, which is always present, unlike those oxidation-halogenations of the prior art wherein there is no solid reductant present. Meanwhile, the titanium tetrahalide goes off in a gas stream, from which it may be separated readily by known means, as the pure compound. This is the most readily purified and most often used compound of titanium as the intermediary in making either the metal or the pigment, titania.

Thus the reduction-chlorination gives $TiCl_4$ in a gas stream which can be separated so that it has little or practically no $FeCl_2$ or $FeCl_3$ therein. The other product is metallic iron having little contamination by titanium or titanium compounds.

ACCOMPLISHMENTS OF THE PROCESS

In the use of iron-containing titaniferous ores or residues to produce molten iron and titanium tetrachloride, the separation by reduction-chlorinations in which the present process has as its objects and does accomplish:

a. the use of common salt and/or calcium chloride or other chloride of an alkaline or alkaline earth metal to supply a major part or all of the chlorine required for the chemical reactions and/or makeup;

b. the chemical reaction of the sodium of the salt- and/or the metal of another chloride used-with the silica, present in or added to, the ore or residue. The molten silicate formed acts as a flux for removing various solid or molten impurities or gangue from the molten iron.

Other objects and accomplishments are demonstrated in the further description of the chemistry and operation of the process.

CHEMISTRY OF THE PROCESS

Contrary to the previous art, the presence of a solid reductant, usually coke, has been found to be quite desirable in the present chlorination to separate from ilmenite (a) iron as the chloride, then (b) titanium as the chloride. Previously coke was usually excluded; and the production of iron chloride (as $FeCl_3$) was an oxidation-chlorination because of effects which were considered undesirable, as will be evident later. Also, if coke is present, it can be burned with oxygen or air supplied, with the additional chlorine which may sometimes be used, to give heat for bringing the reactants up to the desired optimum temperature for the reaction.

The copending application Ser. No. 352,947, now U.S. Pat. No. 3,859,077 accomplished a reduction-chlorination by chlorine gas and the separation of $TiCl_4$ and iron from ilmenite by several chemical reactions operating in somewhat of a cycle, and always in the presence of a solid reductant, such as coke:

$$TiCl_4 + 2FeO \rightarrow 2FeCl_2 + TiO_2 \quad (1)$$

$$TiCl_4 + Fe_2O_3 + C \rightarrow 2 FeCl_2 + TiO_2 + CO \quad (1a)$$

$$2FeCl_2 + TiO_2 + 2C \rightarrow TiCl_4 + 2Fe + 2CO \quad (2)$$

$$FeO + TiO_2 + 2Cl_2 + 3C \rightarrow TiCl_4 + Fe + 3CO \quad (3)$$

A comparable reaction to Equation 3 takes place with $Fe_2O_3$ present in the ore. While the carbon present is not shown in Equation 1, if it was not present, and this was then an oxidation-chlorination, $FeCl_3$ instead of $FeCl_2$ would be formed.

While iron from the oxide has a much greater affinity for chlorine as shown in Equation 1 where $FeCl_2$ is formed, in the absence of a reductant, the very much greater affinity of oxygen for titanium, or greater ease of reducing iron shows up as counterbalancing this to give metallic iron in Equations 2 and 3.

These reactions may be accomplished in a single reactor. However, they could also be operated in two continuous reactors: then the reaction of Equation 1 is accomplished in the presence of carbon in the first reactor, with discharge of solid $TiO_2$ to the top of the second reactor, and the recycling of gaseous $FeCl_2$ to the bottom of the second reactor. Here the reaction of Equations 2 and 3 take place, with part of the $TiCl_4$ — formed from both $FeCl_2$ or $Cl_2$ — being withdrawn as one product, and the balance being recycled to the first reactor to accomplish the reaction of Equation 1.

These chemical reactions — all reduction-chlorinations — accomplished the invention of the copending application and used elemental chlorine to supply: (a) that discharging as $TiCl_4$ product, (b) that discharging as chlorides of the titanium and some other elements in the gas and as solids in the gangue, and (c) that lost in the cyclic processing. The chlorides of the alkaline metals and earths, and particularly common salt, also calcium chloride, represent the cheapest form of chlorine; but the strong combination of chlorine with these metals for which it has a much greater affinity than for iron or titanium prevents these chlorides from being used directly in the normal chlorination.

It has now been found, however, that particularly if the iron oxide of the original material is in the ferric state and in the presence of (a) coke, (b) silica - either that normally found associated with titaniferous iron ores or slags or added as sand or other siliceous material, and (c) the chloride of an alkaline or alkaline earth metal, this third-metal chloride breaks down. Its components combine with other materials present: the chlorine unites with the titanium; and the alkaline or alkaline earth metals unite with the silica for which it has a great affinity and a high heat of reaction. This additional reaction and the change in free energy involved therein overcomes the comparatively high affinity of this third-metal for chlorine, similar to the above noted formation of $TiCl_4$ from $FeCl_2$, due to the greater ease of reduction of iron.

Substantially, there may be regarded two affinity series as being involved; and the resulting reactions are due to the sum of the priority effects of the metals: in the case of Equations 3 and 4, there is the oxidation reduction series to consider, taken together with the chlorine affinity series; while in the other case, it is the silica affinity series in combination with the chlorine affinity series. In both cases it is the sum total or net effect which is important.

Also, it may be desirable to add a stream of oxygen or air to burn a part of the coke to CO or even to $CO_2$, and thus give sufficient heat to bring the materials charged up to the desired temperature and supply any undesired heat loss from the reactor. Similarly gaseous chlorine may be added to complete the chlorination of the $TiO_2$. Usually, no chlorine gas or only small amounts are required compared with the total chlorine demand as otherwise required by the reactions of the copending application.

As a means of explaining this newly developed processing, the following equations may be written as typical of the reactions which have been found to give these desired products: iron and $TiCl_4$ from chemical interaction with titaniferous iron ores or residues with salts of the three lower halogens with metals of the alkaline or alkaline earth metals:

$$4NaCl + Fe_2O_3 + TiO_2 + 2SiO_2 + 3C \rightarrow 2Na_2SiO_3 + 2Fe + TiCl_4 + 3CO \quad (4)$$

$$2CaCl_2 + Fe_2O_3 + TiO_2 + 2SiO_2 + 3C \rightarrow 2CaSiO_3 + 2Fe + TiCl_4 + 3CO \quad (5)$$

$$2CaCl_2 + FeO + TiO_2 + 2SiO_2 + C \rightarrow 2CaSiO_3 + Fe + TiCl_4 + CO \quad (6)$$

It is probable that each of these chemical reactions is made up of several intermediate reactions, some of which may be represented by Equations 1, 2 or 3. In these reactions of normally solid compounds, it is to be noted that at the desired temperature all of the chlorides used have at least a substantial vapor pressure and are partly or completely in the vapor phase. Also, it is highly probable that individual reaction steps include formation of other gases, e.g., $FeCl_2$ which, in turn, reacts with the $TiO_2$ present. Any of several chemical mechanisms, which may have several steps or a cycle of steps may be involved in producing the final products, the molten iron, the $TiCl_4$, and the silicate flux which removes other solid impurities to assist in completing the net or overall reaction, and is discharged separately as a molten slag.

The reaction of Equation 4 occurs at temperatures preferably above the melting point of iron, 1535° C; and above 1700° C it proceeds with increased velocity, always in the presence of excess carbon and salt. If the temperature is below 1535° C, the iron is solid and is mixed with the sodium silicate and the $TiO_2$ of Equation 4. The $TiCl_4$ formed may react with any excess $Fe_2O_3$ in a reaction comparable to that of Equation 1.

The excess of carbon and salt is mixed in with the ore, together with any added siliceous material, as sand, if necessary, to be fed into the reactor. The $TiCl_4$ and any $FeCl_2$ or $FeCl_3$ which may also be formed may readily be condensed out of the CO and other gases leaving this reactor. Alternatively, this gas stream may pass to another reactor separately charged, as for example the first reactor of the co-pending application, so that the $TiCl_4$ may react with the iron oxide of the fresh charge as more fully explained therein.

The reaction, as presupposed in Equation 4, uses twice as much iron as titanium; and in some ores this may be the existing ratio. In pure ilmenite, there are the same number of atoms of iron as titanium; but often there is an additional amount of iron oxide present as in the ilmenite-hematite ores. However, two reactors may be operated in a cyclic system so that only part of the iron is chlorinated in the first reactor by supplying only an adequate amount of the gas stream containing $TiCl_4$, and the solids residue from the first reactor has the ratio of 2 atoms of iron to 1 atom of titanium, as in Equation 4. Other methods are also available in the cyclic system for controlling the respective amounts of reactants necessary for Equation 4.

Also, Equation 4 is written for ferric oxide. The normal ferrous oxide of ilmenite (and some other titaniferous ores) is readily converted to the ferric state (hematite) by roasting in air; and the reduction-chlorination operation proceeds more readily if the $FeO_2$ has priorly been converted to hematite ($Fe_2O_3$) by roasting. (This is demonstrated by the reaction of Equation 5 which is found to proceed more readily than that of Equation 6.) Also, in an ore containing FeO, this may be chlorinated in the first reactor, according to Equation 1, while the $Fe_2O_3$ is chlorinated in the second reactor according to Equation 4.

Sodium silicate or water glass forms with different amounts of the $SiO_2$ present in uniting with the available sodium of the salt, and the chlorides of other alkaline or alkaline earth metals may also be used either alone or mixed with common salt to give other silicates which result as mixtures, either chemical or physical, with the sodium silicate. Pure $Na_2SiO_3$ melts at 1088° C; and between the various ratios of sodium to silica, also of silicates of other alkali metals or earths which may be obtained, the melting range of the silicate flux obtained may be varied between about 1000° C and 1700° C. Thus, flux with the optimum properties for aiding the reaction and removing the impurities of different materials containing the oxides of iron and titanium may be selected to aid in removing gangue as slag from the molten iron formed. This molten slag and the iron are removed separately since the slag is lighter and floats on the molten iron as in the conventional blast furnace.

The sodium silicate, particularly if substantially uncontaminated with calcium or other alkaline earth silicates, may be leached from the slag and worked up for any of its many uses.

One of the advantageous features of the invention of the copending application was that the reductant, usually coke, required and used in the second reaction zone or second reactor could be mixed with the original ore or residue to be treated before going to the first reactor, which also operated under reducing conditions to produce $FeCl_2$ instead of $FeCl_3$. The solids discharging from the first reactor included the excess coke and passed directly to the top of the second reactor. Thus, it was not necessary to add coke between the reactors, a decided operating advantage.

Similarly in the present process it has been found that the salt (or other third-metal chloride) and, if necessary, added siliceous material may be mixed and ground, if desired, to the optimum sized particles with the coke and the ore or residue to be treated. Then the mixture of the four components is fed to the reactor, in some cases directly from a high temperature dryer, or a calciner used to oxidize $FeO_2$ to $Fe_2O_3$.

There is no untoward chemical reaction of the salt in the first reaction zone or first reactor; and it appears in the first reactor residue which is largely $TiO_2$, salt, and excess coke, as well as any unchlorinated iron oxide. All of these solids then go to the top of the second reactor, operating at the higher temperature.

The above shows that the reaction of Equation 1 may take place in a first reaction zone at a temperature of 600° to 1000° C, or even up to 1200° C; that of Equation 2 the essential one of the invention of the copending application may be at least partially accomplished along with the reaction of Equation 4 in a second reaction zone at a temperature above the melting point of iron and up to 1950° C. The reaction of Equation 4 replaces that of Equation 2 almost entirely; and very little, if any, elemental chlorine is required to be added. A part of the TiCl$_4$ is passed from the second reaction zone to the first, either before or after removal of the other materials in this gas stream leaving the second reactor. The TiCl$_4$ leaving the system as product contains chlorine which has entered the system either as chlorine gas or in combination with the third metal as the chloride.

All operations of the process are conducted at essentially atmospheric pressure, except for the slight pressures required to move gas streams though a reactor of whatever type may be used, usually in countercurrent flow to particulous solids. A somewhat lower gas pressure is required to move the gas stream in parallel current to the flow of particulous solids.

In many cases, there may be required only one reactor operating at a temperature about the melting point of iron, but dependent on the composition of the feedstock to be handled. This reactor would supply essentially the functions of a conventional blast furnaace and might operate, as does the blast furnace, at a maximum temperature up to about 1950° C. Here is charged, however, the original material containing the oxides of titanium and iron, sand, and silica, also a chloride salt of a third-metal, e.g., an alkaline or alkaline earth metal to supply chlorine for the reduction chlorination which produces titanium tetrachloride and other chlorides.

Whether one or two reaction zones or reactors are used, the solids need only be heated once for the attack on the ore and the separation of the desired products and impurities. This may be after the prior drying or even roasting of the ore to remove water and, in some cases, to oxidize the ferrous oxide present to ferric oxide. In a two reactor system, as in the copending application, the gaseous stream from the first reactor first may have the FeCl$_2$ condensed out and then reevaporated to enter the second reactor. Similarly, the gaseous TiCl$_4$ stream from the second reactor may be cooled and otherwise processed to remove the other constituents before going into the first reactor. Essentially, however, the solids do not need to be reheated, the processing may take place with them being progressively heated until they reach the highest temperature required for the chemical reactions without intermediate cooling. One such sequence for a mixture of the reacting solids in correct amounts and desired particulate size would be (1) a drying up to 500° C to remove all combined water, (2) a calcining in the presence of air to oxidize FeO to Fe$_2$O$_3$ at a temperature up to 700° C, (3) a first reduction-chlorination at a temperature up to 1100° C with TiCl$_4$ to give FeCl$_2$, possibly some solid metallic iron, (4) a second reduction-chlorination using FeCl$_2$ at temperatures up to 1950° C.

However, in some other cases, the first of two reactors may operate at a temperature below 1000° C to give to a mixture of the ore, calcium chloride, coke and silica the following reactions:

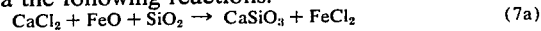
(7a)

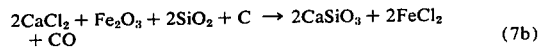
(7b)

Also accomplished would be the reactions of Equations 1 and 1a if TiCl$_4$ was introduced from the second reactor as in the copending application; and the FeCl$_2$ formed in the first reduction-chlorination would then pass to the higher temperature of the second reduction-chlorination in the second reactor. Equations 5 and 6 are essentially the sum of the overall reactions of Equations 7a and 7b, respectively, added to Equation 2.

The temperature would be well below the melting point of CaSiO$_3$ in the first reactor which, if formed, would be a solid and would pass to the second reactor along with the other solids: TiO$_2$, coke, excess iron oxide, SiO$_2$ and CaCl$_2$. There, at a temperature of 1550° to 1950° C, the reaction of Equation 2 would take place (as well as those of Equations 5 and 6, if any iron oxide was still present), the CaSiO$_3$ would melt and act as a flux to be drawn off as a slag, the iron being tapped from a lower point.

EQUIPMENT USED

Either batch or continuous processing equipment is used as in the copending application to attack the ores and to produce therefrom the molten iron metal and TiCl$_4$. Here there is also produced a silicate slag. The ore is first milled to the desired particulate or pulverent form — depending on the type of reactor used — preferably after mixing with salt, coke, and added siliceous material if necessary. The mixture is then thoroughly dried and calcined to minimize the presence of free or combined water, which, if retained, reacts with chlorine and metal chlorides to give hydrogen chloride. This is a waste of chlorine, and a hazard to equipment because of its corrosiveness.

The chemical processing may be done in any one of the many batch, cyclic, and continuous types of reactors, furnaces, and roasters. They may have fixed or moving beds, or fluidized beds, or may be cyclone contactors for fine particles with hot gases, or multiple rotating hearths or other type of equipment used for such chlorinations. They must be constructed of various known materials which are proof against the corrosive conditions which pertain.

The design of the equipment is not part of the present invention; however, it has been found that the reactors, when continuous processing is used, should maintain in some cases as nearly as possible a countercurrent flow of gases and solids. In other cases, concurrent flow is specified. Desirably, to insure the maximum efficiency of the reactions, each of the two reactors used as reaction zones for continuous processing should have more than one equilibrium unit for contacting gases and solids, and desirably three such units. In another case, the use of a single reactor, this may have all materials flowing in the same direction; but here again, the height should be equivalent to that of several equilibrium units.

In the use of a single reactor or reaction zone wherein at least one of the overall reactions such as represented by the essential Equations 4, 5 or 6 is accomplished, this may be a unit similar to those of one of the many types used for reducing iron with oxygen or air. (In fact, a blast of air or oxygen may be supplied in those cases where iron oxide approaches the bottom draw-off). A sequence of two or more fluidized beds may be used with the CO produced being recycled as the fluidizing gas.

While the blast furnace is a single countercurrent reactor, the operation may have some advantages, if conducted in parallel flow of all materials as will be exemplified hereinafter.

The mixture of the four solid components may be ground to a fine particle size — below 20 to 40 mesh — and may then be briquetted. The size of the particles charged depends on the type of reactor used. For some types of reactors, e.g., cyclones, very fine particles are desired; i.e., of the order of 100 to 200 mesh; in others, for example, a blast furnace, very much larger lumps, are required.

BATCH OPERATION

The invention may be demonstrated by a batch operation on a laboratory bench using standard refractory equipment constructed of special metals, graphite, mullite, silicon carbide, alumina, etc.

Thus, a combustion tube in a furnace capable of heating it to 1600°–1800° C may be used as the reactor for producing titanium tetrachloride and iron. It is charged with a mixture of ilmenite, coke, sand, and anhydrous calcium chloride. These will have been thoroughly dried, pulverized to pass a 100 mesh standard screen, and mixed together, then briquetted to pellets about ⅛ inch maximum dimension.

This tube and contents is heated to a temperature of 1600° C to 1700° C, in the range of the boiling point of calcium chloride, and above the melting point of iron at 1535° C. The left end of this tubular reactor terminates in a small inlet which may be used for addition of oxygen and/or chlorine. Gases formed in the chemical reaction exhaust at the right end which is connected to an air-cooled condenser, a water-cooled condenser, and wash bottles.

The reaction of Equation 6 takes place, promoted in some cases by a small amount of chlorine or oxygen. The gases formed include, besides the $TiCl_4$ and $CO$, some amount of $FeCl_2$ which may not have opportunity to react with $TiO_2$ to give $TiCl_4$, also $SO_2$ from any sulfur in the coke, also HCl from any hydrogen in the coke or in water inadvertently present. The $FeCl_2$ is condensed out in the air cooled condenser and the $TiCl_4$ is condensed in the water cooled condenser, while the $SO_2$ and HCl are scrubbed out in the wash bottles, and the CO discharges with other permanent gases.

The residue contains the iron formed as a liquid in a solidified bead, while the calcium silicate as a flux has agglomerated any gangue and unreacted solids into a slag.

Similarly, the reactions of Equations 4 and 5 may be demonstrated.

CONTINUOUS OPERATION

The same reactor may be installed vertically and operated either batchwise or with a continuous or an intermittent supply at the top of the mixture of the same briquettes made from the four solids, ore (with the iron preferably present as $Fe_2O_3$, possibly by pre-roasting in air), sand, salt or calcium chloride, and coke. Oxygen and/or chlorine may also be supplied at the top although usually not necessary; and product gases discharge at the bottom along with molten iron and slag. If $CaCl_2$ is used, the reactions of Equations 1, 1a, also 7a and 7b take place as the solids are heating up in their descent; while the $FeCl_2$ and thee $TiO_2$ proceeding downwardly together then give the reactions of Equation 2, also of Equations 5 and 6 as the temperature increases to about 1550° C to 1700° C. The iron melts and is withdrawn; and the liquid flux of $CaSiO_3$ carries off the gangue.

In the continuous two reactor system, as indicated above, there is charged at the top of the first reactor a mixture of anhydrous $CaCl_2$, sand, ilmenite, and coke, properly sized for the most efficient type of equipment used, e.g., fines for fluidized beds, multiple hearth furnaces, cyclones, etc., with much larger briquettes, particles or lumps for some other types of reactors. Reduction-chlorination indicated by Equations 1, 1a and 7b take place at a temperature of 600° to 1000° C, the solids of these reactions would pass off the bottom and discharge (most readily into the top of the second reactor. These solids would contain $TiO_2$, excess coke, $CaCl_2$, and sand, also any unreacted iron oxides.

Meanwhile, the $FeCl_2$ in the gas stream discharging from this first reactor would be separated by physical means as in the copending application from other gaseous materials, including CO and impurities as volatile oxides, chlorides, or oxy-chlorides of small amounts of S, P, Cr and Va present as impurities in any of the solids being processed. The $FeCl_2$ would then be passed also to the second reactor operating with a maximum temperature between 1550° and 1950° C. The reduction-chlorination of Equation 2 takes place; also if iron oxide has come unchanged from the first reactor, it is reacted by a reduction-chlorination using $CaCl_2$ as the chlorinating agent according to Equations 5 or 6, with the excess $CaCl_2$ and coke present. This gives molten iron for withdrawal, also a molten slag agglomerated by the molten $CaSiO_4$ as a flux of other solid impurities. After separation of the gas stream leaving the second reactor, the $TiCl_4$ produced is partly withdrawn as product and partly returned for the reduction-chlorination in the first reaction zone.

The efficiency of the reactions in the two reaction zones of solid-gaseous contacting is usually better if the gas phase is moving in one direction (usually rising) as the solids move in the other direction, (usually falling). However, the relative ease of operation may specify a concurrent flow of the two streams in some reactors or with some titaniferous, iron-containing materials. In either case, one or both of the reaction zones in the process should have, desirably, the equivalent of from 1 to 3 equilibrium units.

If additional chlorine is required to finish completely the reduction-chlorination of either iron or titanium in either of the reactors, it may be added, usually to the second reactor. Also, if oxygen (or air, if used) is required to burn coke to increase the temperature to speed the reactions, this also is added near the base of the second reactor, as in a blast furnace.

Many modifications may be considered of the process for producing $TiCl_4$ and metallic iron from ilmenite and other materials containing the oxides of iron and titanium. Besides differences in the original material to be processed, other factors which have to be considered and optimized where possible include: temperatures, methods of pre-preparation of raw materials, materials of construction of equipment, type of reactor to give the desired efficiency in the reaction zones with the maximum throughput, and others. These process variations are defined, as included in the following claims.

I claim:

1. A process conducted at approximately one atmosphere pressure for making metallic iron in a dense phase from an original material containing titanium oxide and at least one iron oxide comprising:
   a. reacting chemically while heating to a maximum temperature between 1535° and 1950° C, said original material with silica, a solid reductant, and a halide of a third metal chosen from the alkaline and alkaline earth metals; said halide being present in at least a sufficient amount to supply the halogen necessary to produce the tetrahalide of all of the titanium present in said original material; and said silica being present in at least a sufficient amount which, when added to that present in said original material, will combine with all of said third metal in said halide;
   b. producing by chemical reaction:
      i. a dense phase containing iron from said iron oxide;
      ii. a gaseous phase containing titanium tetrahalide from said titanium oxide;
      iii. a liquid phase flux comprising a silicate of said third-metal chosen from the alkaline and alkaline earth metals and said silica, and containing some solid impurities coming from at least one of the following: said original material, said silica, said solid reductant, and said third-metal halide;
   c. removing from said reaction zone and separating from each other said dense phase containing iron, said gas phase containing said titanium tetrahalide, and said liquid phase flux; and
   d. refining said gas phase to obtain titanium tetrahalide in usable form.

2. The process according to claim 1, wherein said making of said dense phase containing metallic iron, said gaseous phase containing said titanium tetrahalide and said liquid phase flux is accomplished in a single chemical reactor.

3. The process according to claim 2, wherein said original material, said third metal halide, said silica, and said solid reductant are fed into the upper part of said chemical reactor operated at a maximum temperature between 1535° and 1950° C; and said dense phase containing iron, said gaseous phase containing titanium tetrahalide, and said liquid flux, are each discharged separately near the bottom of said reactor.

4. The process according to claim 1, wherein oxygen is admitted to react with part of said solid reductant to give the heat required to bring the reacting materials for said chemical reaction up to 1535° to 1950° C and to maintain that temperature.

5. The process according to claim 1, wherein elemental halogen selected from the group consisting of fluorine, chlorine, or bromine is added to said chemical reaction to produce with said titanium oxide a minor part of said titanium tetrahalide, formed in a major part from the halogen from said halide of a third metal.

6. The process according to claim 1, wherein said original material, said third metal halide, said silica, and said solid reductant are heated, along with the dense phase products of any chemical reactions, to a maximum temperature of not over 1950° C without an intermediate cooling and reheating.

7. The process according to claim 1, wherein of the four solids entering said chemical reaction: said original material, said third metal halide, said silica, and said solid reductant — at least one is heated previously to a temperature at least sufficiently high to drive off water which is physically and chemically bound.

8. The process according to claim 1, wherein said original material is roasted in contact with oxygen to oxidize any ferrous oxide originally present to ferric oxide, prior to said chemical reaction.

9. The process according to claim 1, wherein said halide of said third metal is a chloride of an alkaline or alkaline earth metal and said titanium tetrahalide is titanium tetrachloride.

10. The process according to claim 9, wherein said chloride of said third metal comprises sodium chloride and said silicate formed comprises sodium silicate.

11. The process according to claim 3, wherein said halide of said third metal comprises calcium chloride and said silicate formed comprises calcium silicate.

12. The process according to claim 1, wherein from two to four of said four solids entering said reaction: said original material, said halide of said third metal, said silica, and said solid reductant — are premixed together.

13. The process according to claim 12, wheerein the premixture of two to four of said solids is milled to size before entering said reaction.

14. The process according to claim 13, wherein said premixture is heated to a temperature sufficient to drive off water before entering said reaction.

15. A process conducted at approximately one atmosphere pressure in two chemical reaction zones — a first and a second — for making metallic iron in a dense phase from an original material containing titanium oxide and at least one iron oxide, comprising:
   a. passing into said first chemical reaction zone, which is maintained at a temperature between 600° C and 1000° C, four solids: said original material, silica, a solid reductant, and at least one chloride of a third metal chosen from the alkaline and alkaline earth metals, said chloride being present in at least sufficient amount to supply the chlorine necessary to produce the tetrachloride of all of the titanium present in said original material; and said silica being present in at least a sufficient amount, which when added to that present in said original material will combine with all of said third metal in said halide;
   b. chlorinating in said first chemical reaction zone by titanium tetrachloride in an added gaseous stream a substantial part of the iron in said iron oxide in said original material to produce by a first chemical reaction an iron chloride in a gas stream and additional titanium oxide;
   c. separating said gas stream containing said iron chloride from the solid residue of said first chemical reaction, said solid residue comprising substantially both the titanium oxide in said original material and that formed in the first chemical reaction, also said chloride of said third metal, also said silica, also an excess of said solid reductant over that used in said first chemical reaction;
   d. passing a substantial part of said separated gas stream containing said iron chloride into said second chemical reaction zone maintained at a maximum temperature between 1535° and 1950° C;
   e. passing a substantial part of said solid residue of said first chemical reaction zone into said second chemical reaction zone;
   f. reacting in said second chemical reaction zone by a second chemical reaction said iron chloride in said gas stream with said titanium oxide, said silica, said chloride of said third metal and said solid reductant, all of which have come in the solids residue from said first reaction zone;

g. producing in said second reaction zone by said second chemical reaction: molten metallic iron, the fused silicate of said third metal, and a gas stream containing said titanium tetrachloride;

h. separating said gas stream containing said titanium tetrachloride and passing at least a part of said titanium tetrachloride back to said first chemical reaction zone to allow it to enter into said first chemical reaction; and i. separating said molten iron and said fused silicate which acts as a flux to carry away from said molten iron at least some of any unreacted solids and impurities present in said four solids charged to said first reaction zone.

16. The process according to claim 15, wherein at least a part of said titanium tetrachloride coming in a gas stream from said second chemical reaction zone is removed as a product.

17. The process according to claim 15, wherein said gas stream containing titanium tetrachloride formed in said second chemical reaction zone is separated from at least a part of the gaseous materials it contains other than said titanium tetrachloride before being utilized in said first chemical reaction.

18. The process according to claim 15, wherein:

a. some part of said iron chloride produced in said first chemical reaction zone and leaving in a gaseous stream is ferrous chloride;

b. said ferrous chloride in said gaseous stream is passed into said second chemical reaction zone to contact said solid residue, which also has left said first reaction zone; and c. some part of said ferrous chloride combines in said second chemical reaction zone with some part of said titanium oxide and some part of said silica and some part of said solid reductant, all in said solid residue which has left said first chemical reaction zone, to give: molten iron, a gaseous stream containing said titanium tetrachloride, and a liquid flux containing a silicate of said third metal.

19. The process according to claim 18, wherein said liquid flux carries with it some part of: the excess of at least one of said four solids passed to said first chemical reaction zone, any solid impurities in said four solids, and any solid impurities formed in said two chemical reaction zones.

20. The process according to claim 18, wherein said gaseous stream separated from said solid residue leaving said first chemical reaction zone contains, in addition to said ferrous chloride, other gases — as oxygen and chlorine compounds of any sulfur, phosphorous, chromium and vanadium present in said original material, said silica, and said reductant, and of carbon in said reductant; and at least some part of said other gases is removed from said gaseous stream; and said ferrous chloride in a more pure form than it left said first chemical reaction zone is passed to said second chemical reaction zone.

21. The process according to claim 18, wherein said first chemical reaction is accomplished during a first concurrent flow in said first chemical reaction zone by contacting of a mixture of the solids in particulant form, said solids comprising said original material, said silica, said third metal chloride, and said solid reductant, with a gas phase which contains a minor amount of a gas capable of chlorinating at least one of the constituents of said original material under conditions pertaining in said first chemical reaction zone; and said second chemical reaction is accomplished at the higher temperature in said second chemical reaction zone during a second concurrent flow of solids resulting from said first chemical reaction and at least some part of the gas phase resulting from said first chemical reaction, which gas phase contains a minor amount of a gas capable of chlorinating of at least one of the constituents of said original material under the conditions pertaining in said second chemical reaction zone.

22. The process according to claim 21, wherein said original material contains both ferrous oxide and ferric oxide and said gas phase in concurrent flow in said second chemical reaction zone in ferrous chloride and is also capable of forming with said silica and said third metal chloride, in the presence of the solid reductant, a silicate with said third metal, and molten iron.

23. The process according to claim 21, wherein said gas phase at the discharge of said second concurrent contacting in said second chemical reaction zone contains at least most of the titanium present in said original material as titantium tetrachloride.

24. The process according to claim 23, wherein said discharging gas containing titanium tetrachloride has removed therefrom at least a part of the other materials also contained therein; and the remaining said titanium tetrachloride is recycled in part to said first concurrent contacting in said first chemical reaction zone, and in part is withdrawn as product.

25. The process according to claim 21, wherein said original material, said silica, said third metal chloride, said solid reductant, and a minor amount of gaseous chlorine are fed into an upper part of a single reactor vessel having said first reaction zone above said second reaction zone, and there discharges from near the bottom of said reactor vessel: titanium tetrachloride in a gas stream, molten iron, and a silicate of said third metal.

26. The process according to claim 24, wherein:

a. a minor part of said gaseous titanium tetrachloride, a reactant for said first chemical reaction, is produced by the preliminary reaction of gaseous chlorine with the titanium oxide in said original material in the presence of said carbonaceous reductant; and the major part of said chlorine used to produce said titanium tetrachloride comes from the chlorine of said chloride of a third metal;

b. said products of said preliminary reaction continue said concurrent flow and concurrent contacting throughout the respective zones wherein said first chemical reaction takes place and said second chemical reaction takes place.

27. The process according to claim 15, wherein:

a. said first chemical reaction is accomplished in a countercurrent contacting of said gaseous titanium tetrachloride with the solids in particulate form of said original material, said silica, said third metal halide, and said solid reductant, and b. said second chemical reaction is accomplished in a countercurrent contacting of at least a part of said titanium oxide in said solid residue of said first chemical reaction with said ferrous chloride in gaseous form also produced by said first chemical reaction.

28. The process according to claim 15, wherein some part of the heat required to bring the reactants in at least one of the two said chemical reaction zones up to its respective optimum temperature is supplied by the combustion of a part of said solid reductant through the addition of an oxygen-containing gas to at least one of said reaction zones.

29. The process according to claim 15, wherein said iron chloride is, at least in part, ferrous chloride, a minor amount of the chlorine therein being supplied by chlorine gas being added to at least one of the chemical reaction zones; and the sum of the chlorine in the chlorine gas supplied and in the third metal chloride supplied to the two said chemical reactions is, in total amount, at least stoichiometrically equivalent to that in said titanium tetrachloride which is removed as a product.

30. The process according to claim 29, wherein said original material contains elements other than titanium and iron, said other elements being capable of forming compounds with chlorine; and the total of the chlorine supplied as said chlorine gas, and as that in the third metal chloride is in an amount sufficient to form, in addition to said titanium tetrachloride, chlorine compounds with at least some part of some of said other elements capable of forming compounds with chlorine.

31. The process according to claim 30, wherein at leaast some of said compounds of chlorine formed of said other elements present in said original material other than titanium and iron are more volatile than ferrous chloride and are separated from the gaseous stream of ferrous chloride leaving said first chemical reaction.

32. The process according to claim 30, wherein at least some of said compounds of chlorine formed of said other elements present in said original material other than titanium and iron are more volatile than ferrous chloride and are separated from the gaseous titanium tetrachloride formed in said second chemical reaction.

33. The process according to claim 30, wherein at least some of said compounds of chlorine formed of said other elements present in said original material other than titanium and iron are less volatile than ferrous chloride and are removed in said flux from said second chemical reaction zone.

34. The process according to claim 15, wherein said original material is ilmenite.

35. The process according to claim 15, wherein the several steps are conducted in batch processing.

36. The process according to claim 15, wherein said first chemical reaction and said second chemical reaction are conducted in continuous reactors for contacting a stream of gas with a stream of particulate solids, at least one of which reactors has from one to three equilibrium units of contacting efficiency.

37. The process according to claim 15, wherein the solids resulting from said first chemical reaction with said original material, and then of said second chemical reaction starting with said residue of said first chemical reaction, are heated to a final maximum temperature, above the melting point of iron, without an intermediary cooling and reheating.

38. The process of claim 15, wherein some part of said process is open to atmospheric pressure; and the pressure in all other parts varies from atmospheric only by amounts necessary to cause appropriate flows of the several reactants and products in said parts.

* * * * *